MEASUREMENT OF TRANSMISSION TIME DELAY

Filed Oct. 18, 1952 2 Sheets-Sheet 1

INVENTOR
P. MERTZ
BY H. A. Burgess
ATTORNEY

INVENTOR
P. MERTZ
BY H. A. Burgess
ATTORNEY

United States Patent Office 2,746,013
Patented May 15, 1956

2,746,013

MEASUREMENT OF TRANSMISSION TIME DELAY

Pierre Mertz, Bellerose, N. Y., assignor to Bell Telephone Laboratories, Incorporated, New York, N. Y., a corporation of New York Application October 18, 1952, Serial No. 315,495
6 Claims. (Cl. 324—57)

This invention relates to the measurement of the transmission time of a circuit, such as a long line, and aims to secure increased precision of measurement along with greater adaptability to actual service requirements.

In accordance with the invention, the transmission delay time of a line can be continuously indicated by transmitting thereover short pulses of current at separated instants of time. During intervening times the line can be used for data transmission or for other purposes. If the transmission delay of the line changes during transmission of data or messages, this fact is indicated by the measuring equipment making use of the brief interpersed pulses. Where the data is fed into a computer or is used in precision measurements in which variations in line delay affect the result, the ability to indicate transmission time practically continuously and during the data transmission becomes important.

In accordance with the invention short pulses are sent from each end of the line over the line to the distant end. At one end the pulses are sent out at the same instants at which pulses are received at that end from the far end. When this is done the difference in time between sent and received pulses at the far end is equal to twice the transmission time of the line.

In order to control the time of sending of the pulses at one end so as to cause them to arrive at the other end in time coincidence with the pulses sent from that end a phase comparison is made at the latter end between the received and sent pulses, and any departure from phase coincidence results in the sending of control currents over the line to effect a correction in the times at which pulses are sent out from the distant station.

Fig. 1 of the drawing shows in block schematic diagram a complete system embodying the present invention in one form;

Figures 1, 2:
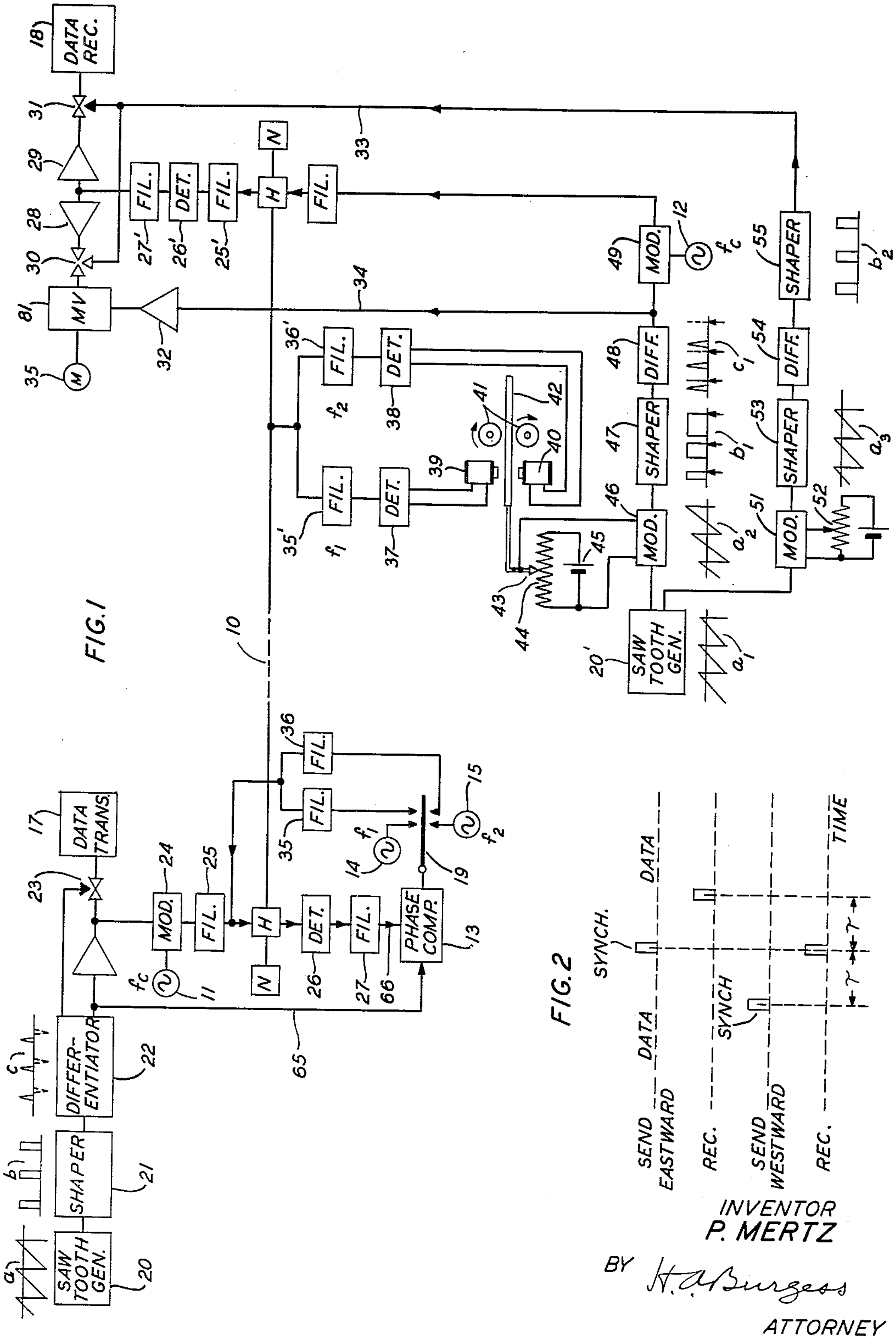
Fig. 2 is a chart showing time relation between certain pulses.

The line 10 represents any suitable transmission line or circuit such as a toll line over which picture signals, telegraph signals or data may be transmitted. At the left station a data transmitter 17 is indicated to illustrate a typical transmitter, and at the right-hand station a corresponding data receiver 18 is indicated. Transmission takes place by means of a carrier wave $f_c$ of suitable frequency such as 1200 cycles per second. Impulses in the form of permutation telegraph code for example, originating in data transmitter 17 are applied to the input of modulator 24 when gate 23 is in its normal or enabled condition, and these impulses modulate 1200 cycle carrier waves from source 11. The modulated output from modulator 24 is transmitted through filter 25 to line 10 by way of hybrid coil H.

At the receiving station the waves received over line 10 are selected in filter 25', detected at 26', and are passed through low pass filter 27' and through the unilateral or amplifying device 29 and the normally enabled gate 31 to data receiver 18. These signals are prevented from going to the left into the meter circuit by the normally disabled gate 30.

The transmission delay of the line 10 is measured in accordance with this invention by sending short pulses of the 1200 cycle carrier waves over the line in both directions from both stations. Pulses of 1200 cycle wave from source 12 at the right-hand end are sent over the line toward the left and similar pulses from source 11 are sent over the line toward the right. A comparison is made in phase comparator 13 between the pulses which govern the sending out of the carrier from source 11 and detected received pulses from the opposite end of the line. These sets of pulses are applied at 65 and 66 respectively. If there is exact time coincidence between these two sets of pulses the switch 19 is in its neutral position. If there is a time difference between these sets of pulses switch 19 is in one of its two extreme positions and sends out current of either frequency $f_1$ or $f_2$ which at the far end advances or delays the sending out of the pulses from the source 12 by a sufficient amount to produce time coincidence in the pulses applied to comparator 13. The difference in time between the sent and received pulses at the right-hand station gives a measure of the transmission delay of the circuit.

Reference will now be made in greater detail to the circuits for carrying out these generally indicated functions.

The timing of the pulses sent out from the generator 11 at the left station is under control of saw tooth generator 20. This may comprise one or more vacuum tubes adapted to be rendered conducting and non-conducting by a timing circuit comprising a condenser and a resistance such as to produce an output wave of the general type indicated at *a*. Such generators are well known in the art. The saw tooth waves are applied to a shaper 21 which is so biased as to admit only the tips of the saw tooth waves, to amplify these waves and to limit them in a manner well known in the art so as to produce rectangular pulses of the type generally indicated at *b*. Shaper 21 is followed by differentiator 22 which produces positive pulses corresponding to no-current-to-current transitions of the pulses *b* and negative pulses representing current-to-no-current transitions. The differentiator circuit includes rectifier means for suppressing the negative pulses so that only the positive pulses *c* are sent into the modulator 24. Differentiator 22 also includes an output control leading to the gate 23 for disabling this gate whenever one of the pulses *c* is transmitted into the modulator 24. This control may include any necessary shaping of the pulses to insure that the gate 23 is disabled for the proper length of time to enable the modulating pulses *c* to pass into the modulator 24 without mutual interference between these pulses and the data pulses.

In a generally similar manner the sending out of pulses from source 12 at the right-hand station is under control of saw tooth generator 20' which may be a duplicate of generator 20. The shaper 47 is also generally similar to shaper 21 and the differentiator 48 is similar to differentiator 22. Included between generator 20' and shaper 47 is a modulator 46 provided with a potentiometer 44 and battery 45 for applying a controllable amount of direct-current bias to the modulator. This has the effect of transmitting to the shaper 47 pulses of different length according as the saw tooth wave $a_1$ is raised or lowered with respect to the zero axis in a manner indicated, with exaggeration, at $a_2$. The output waves from shaper 47 are rectangular in shape but are of different length as shown at $b_1$. The arrows in this diagram indicate the equally spaced times corresponding to the steep fronts of the saw tooth wave. These remain unshifted in time but the sloping portion of the saw tooth wave results in varying the time of occurrence of the leading edge of the waves $b_1$. Consequently when the leading edge is differentiated in circuit 48, the resulting pulse which goes into the modulator 49 can be made to vary in its timing so as to advance or retard the time of sending out of pulses from generator 12.

The amount of direct-current bias applied to moduator 46 from the potentiometer 44 is determined by the setting of the slider 43 which in turn is under control of the pilot waves $f_1$ and $f_2$ sent out under control of phase comparator 13. These may be continuous waves of relatively low frequency such as 300 cycles per second and 400 cycles per second respectively. When neither control wave $f_1$ nor $f_2$ is being received, the slider 43 remains stationary at the point to which it was last moved. When control wave of frequency $f_1$ is received over the line 10, it is selected by filter 35', detected at 37 and energizes magnet 39 which attracts the iron strip 42 upward against the continuously rotating roller 41. The strip 42 and roller 41 are then mechanically frictionally engaged to cause movement of slider 43 towards the left. When control wave of frequency $f_2$ is being received, it is selected by filter 36', detected at 38 and actuates magnet 40 to attract strip 42 against roller 40 to cause movement of slider 43 towards the right. This mechanism is shown for illustrative purposes and by way of example. Any suitable control means for varying the bias applied to modulator 46 may be used, including electronic controls of types well known in the art.

The phase comparator 13 as already noted has applied to it short unidirectional pulses, one set of which comes from the output of differentiator 22 and another set of which comes from detector 26 and filter 27.

Figure 3:
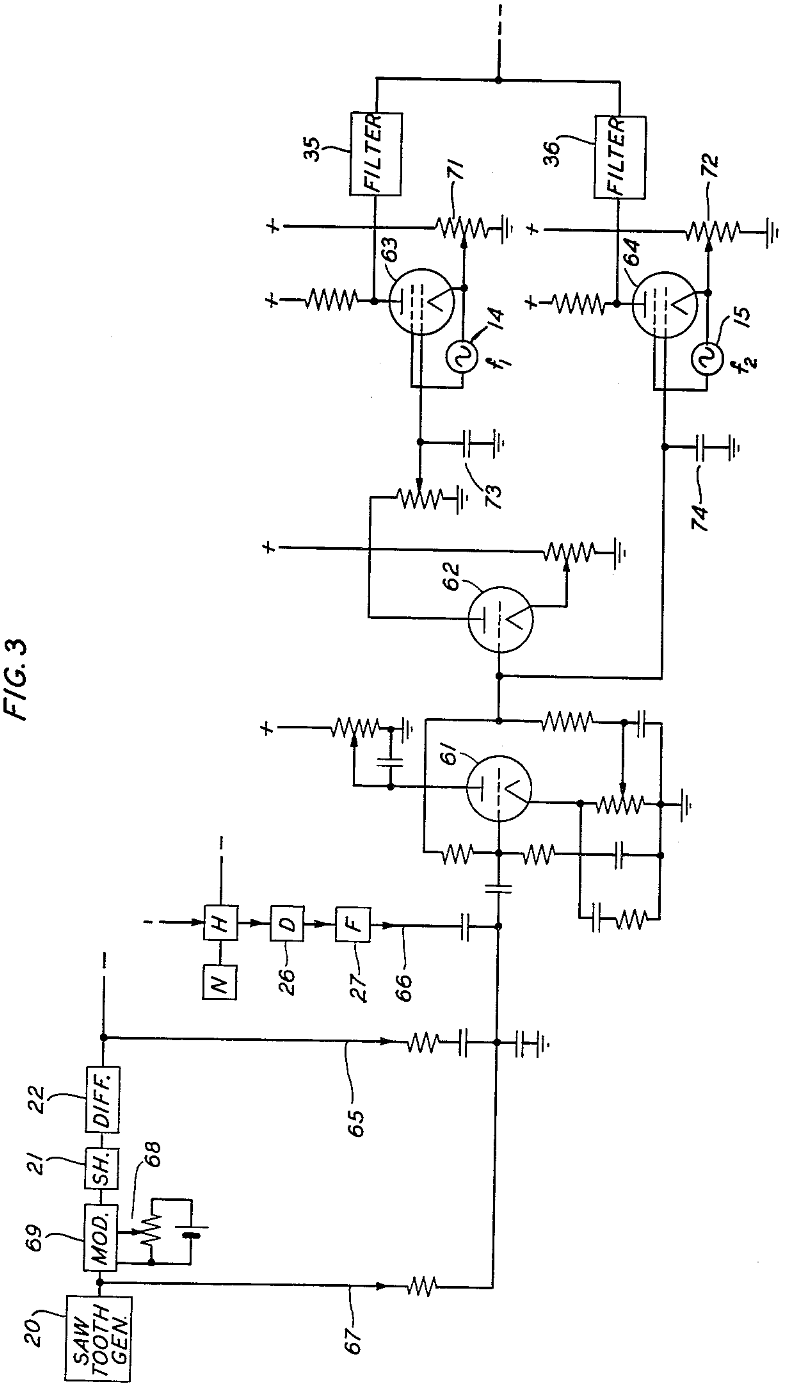
Fig. 3 is a schematic circuit diagram of a phase comparator suitable for use in the system of Fig. 1.

While the phase comparator may be of any suitable known type for switching sources 14 and 15 into circuit when the pulses from one of the two inputs lead or lag those from the other input as the case may be, I have illustrated in Fig. 3 a type of comparator circuit adapted from one described in an article by E. L. Clark entitled "Automatic frequency phase control of television sweep circuits" published in the Proceedings of the I. R. E. in the issue of May 1949 at pages 497 to 500. The circuit of interest is described in section III of the article and its circuit is given in Fig. 3 of page 499.

Referring to Fig. 3 of this application, the phase comparator comprises tubes 61, 62, 63 and 64 together with their various control circuits. The two inputs to the comparator shown on Fig. 1 are also shown at 65 and 66 in Fig. 3. In addition a third input is shown at 67 leading from the output of saw tooth generator 20. In the Clark article the three pulse inputs are numbered 1, 2 and 3. These correspond to 66, 65 and 67 respectively of the present disclosure. A phase reversing triode could be inserted in any of these leads where necessary to bring the phases into the relationship required as shown in the article. A modulator 69 is shown added between saw tooth generator 20 and shaper 21. This is provided with a direct-current biasing circuit similar to that of modulator 46 in Fig. 1. Manual adjustment of the potentiometer 68 in this circuit permits a variation of the relative timing of the pulse inputs in 65 and 67. This allows exact compensation for the delay involved in the shaper 21 and differentiator 22, together with that in any amplification stages and reactive elements which may need to be associated with these functions but are not shown in the figure.

Pulses from 65 and 67 are tied together in time and phase, for a given adjustment at 68. These pulses together given the advantageous shape comprising a sharp peaked saw tooth with rapid falling away on its downward side. If the pulses from 66 arrive with their middle coinciding with this peak, resultant pulses of normal pulse length occur in the output of control tube 61. If they arrive early, longer resultant pulses are produced. If they arrive later, shorter than normal pulses result.

One output from control tube 61 is taken directly to the control grid of amplifier 64. A second output is taken through phase-reversing stage 62 to the control grid of amplifier 63.

Tubes 63 and 64 are provided with adjustable bias controls on resistors 71 and 72 respectively. The adjustments are such that when normal length pulses are produced, the direct-current voltages on condensers 73 and 74 on which the pulses are impressed are of the right value to hold the amplifiers 63 and 64 beyond cut off so that none of the waves from either source 14 or 15 is transmitted through these tubes. If the pulses in the output of tube 61 become longer, the voltage on condenser 74 becomes more negative while that on condenser 73 becomes less negative. When the change in pulse length becomes sufficient, waves from source 14 begin to be transmitted through tube 63, and filter 35 to the line 10 (Fig. 1). If the pulses become shorter a reverse effect takes place, the tube 64 being caused to transmit its pilot wave from source 15 through filter 36 to line.

Reference will now be made to the circuits for measuring time intervals at the right-hand station. In this connection, reference is made to the time diagram shown in Fig. 2. It is usual in data transmission systems to send regularly recurring synchronizing pulses interspersed with the data transmission. These are used in connection with reception and translation of the data. The figure shows relative times at which a synchronizing pulse is sent from each end of the line when using the transmission delay measuring method of this invention. It is seen that the synchronizing pulse as sent out from the west end in the eastward direction (top line) coincides in time with the synchronizing pulse received at the west station (bottom line). In order for this to occur the synchronizing pulse must be sent in the westward direction from the east station a time $2\tau$ ahead of the time of receipt at the east station of the synchronizing pulse sent from the west station; $\tau$ being the transmission delay of the line. The pulses of waves from source 12 will, therefore, always anticipate in time the waves received at the right-hand station from source 11. The pulses $c_1$ fed into modulator 49 are also sent over conductor 34 into a multivibrator 81, the output of which is connected to meter 35. Multivibrator 81 is of a type well known in the art, comprising at least two vacuum tubes, one of which is conducting whenever the other is cut off, and vice versa. The multivibrator is stable in either condition. Normally the multivibrator is in the position in which no current is sent into meter 35. Whenever a pulse appears in conductor 34, however, it shifts the multivibrator to its opposite condition and current starts to flow through meter 35. Multivibrator 81 contains means for limiting the amplitude of this direct current so that it always has the same maximum value. The multivibrator 81 is thrown to its opposite condition cutting off current to the meter when the next ensuing pulse is received over the line through filter 25', detector 26' and filter 27', this pulse passing through unidirectional circuit 28, gate 30 (which is now enabled as will presently be described) and into multivibrator 81, for example to a phase-reversing stage preceding the point to which amplifier 32 is connected. There is thus applied to the meter 35 a unidirectional pulse of current of varying length determined by the difference in time of occurrence of transmitted and received pulses. Since all of the unidirectional pulses applied to the meter 35 have the same amplitude but are proportionate in length to the difference in time of the applied control pulses, meter 35 may be made to indicate directly the difference in time between these control pulses. A suitable integrating circuit such as a low pass filter may be used in conjunction with meter 35.

In order to control the gates 30, 31 a second output is taken from saw tooth generator 20' and applied to a modulator 51 which is similar to modulator 46 but has a manually adjustable potentiometer bias 52 which can be set to produce whatever length pulses may be suitable for any particular application. An adjustment is shown such as to produce the wave $a_3$ which when differentiated at 54 and squared in shaper 55, produces pulses $b_2$ of slightly greater length than pulses, $b$, so as to accommodate slight variations from synchronism between saw tooth generator 20 and 20' or other variables. The pulses $b_2$ are sent over a control 33 indicated as disabling gate 31 and enabling gate 30.

The gates 23, 30 and 31 while indicated diagrammatically, may be of types well known in the prior art. The gates themselves would ordinarily comprise electronic transmission devices to which can be applied operative bias or a large negative bias such as to prevent transmission.

For ease of illustration, the saw tooth waves have been indicated to have such a frequency as to result in rectilinear waves $b$ occupying a considerable percentage of total time. No attempt has been made to indicate the actual percentage of time that might be allotted to data transmission and to transmission time delay measurement respectively. Obviously these time allotments can be varied at will. The frequency of the saw tooth generator wave may be made relatively low and it would be obvious to choose only every $n$th wave for transmitting measuring or synchronizing pulses.

One advantage of the invention lies in the ability to produce a fairly continuous measurement of transmission time delay during the actual transmission of data, thus enabling variations in transmission time delay to be taken into account in the use that is made of the transmitted data.

The invention is susceptible of wide variation and modification without departing from its spirit and scope. It may be applied to radio transmission instead of line wire transmission and is not to be construed as limited to the numerical values that have been given, nor to the precise method of implementation, since these are merely illustrative and are not to be taken as limiting.

What is claimed is:

1. The method of measuring the transmission time of a line or circuit comprising transmitting thereover short pulses of current from first and second stations to each other, starting the pulses from said first station at such times as to cause them to arrive at said second station in time coincidence with the pulses sent from said second station, toward said first station, and measuring at said first station the difference in time between the pulse sent therefrom and the pulse received thereat from the said second station.

2. The method of measuring the transmission delay time of a circuit or path comprising transmitting pulses over said path in opposite directions from first and second stations to each other, at said first station detecting the time difference if any between received and transmitted pulses thereat, sending to the said second station indications of any such time differences, at said second station utilizing said indications to vary the timing of the pulses sent therefrom in such direction and to such extent as to tend to reduce the indications to zero, and at said second station measuring the elapsed time between pulses sent therefrom and pulses received thereat from said first station.

3. In a system for measuring the transmission time of a line or circuit, means at each of first and second stations at the respective ends of the line for generating pulses of current for transmission over the line and means at each said station for receiving the pulses so sent from the other station, means at said first station for controlling the time of sending of the pulses from the said second station so as to arrive at said first station in time coincidence with the pulses sent from said first station, and means at the said second station for measuring the time intervals between pulses sent from that station and pulses received thereat.

4. A system according to claim 3, in which said controlling means comprises a circuit for comparing the times of received and sent pulses at said first station to detect any difference in time therebetween and means under control of said comparing circuit for transmitting control currents to said second station for advancing or retarding the sending of the pulses from that station.

5. A system according to claim 3 in which said generating means comprise means to furnish carrier waves of the same frequency for transmission in both directions over the line and means to transmit as said pulses fragments of said waves short in comparison with the spacings between pulses.

6. A system according to claim 5 including means for sending signals over said line utilizing waves of the frequency of said carrier waves, and means controlled by said pulses for interrupting transmission of said signals except during the time intervals between successive pulses.

References Cited in the file of this patent

UNITED STATES PATENTS

| | | |
|---|---|---|
| 2,514,369 | Buehler | July 11, 1950 |
| 2,623,106 | Fassberg | Dec. 23, 1952 |